E. R. SHNABLE AND J. R. QUINN.
RUNNING GEAR.
APPLICATION FILED MAR. 2, 1922.
1,431,699.
Patented Oct. 10, 1922.
3 SHEETS—SHEET 3.
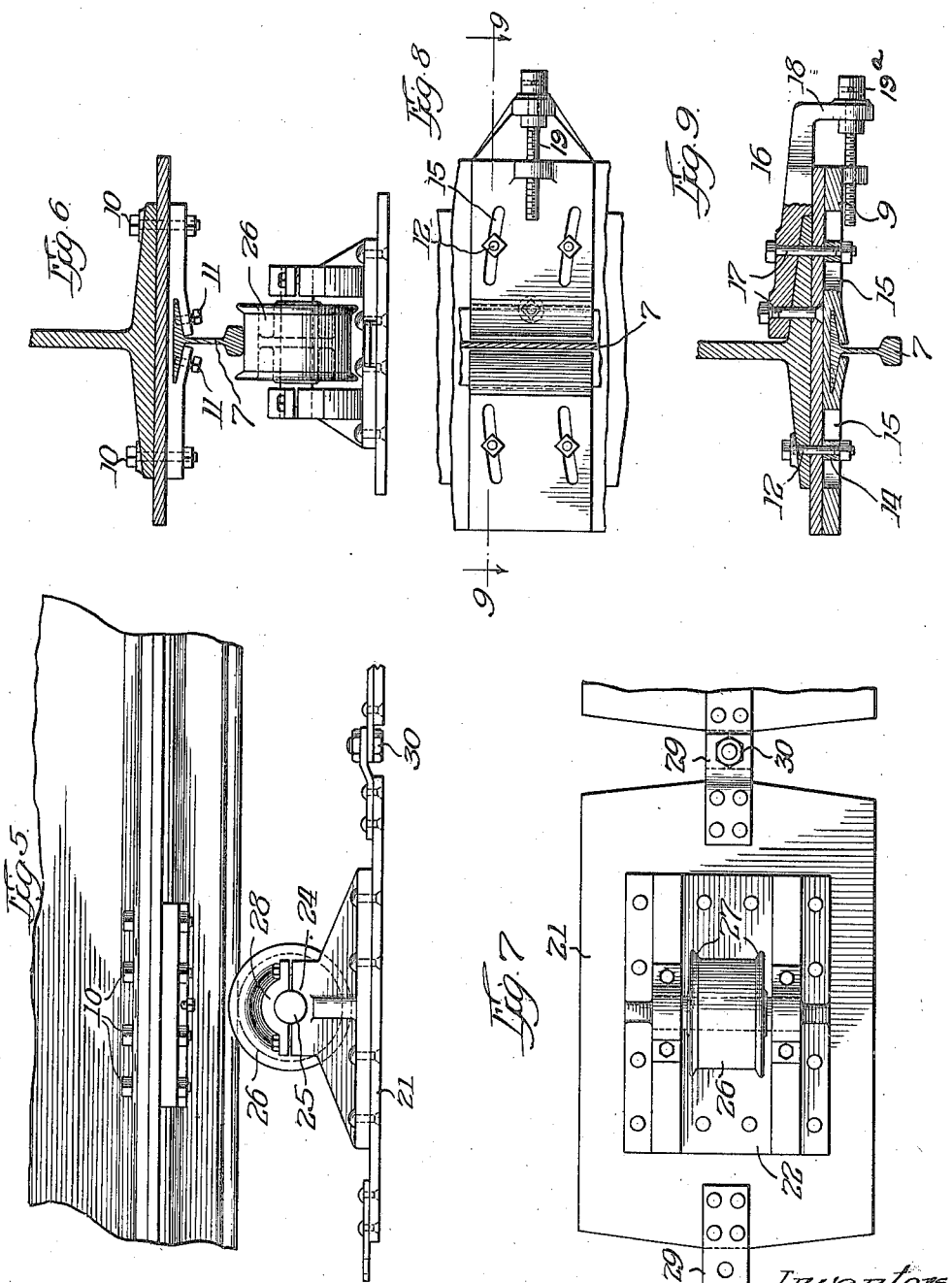

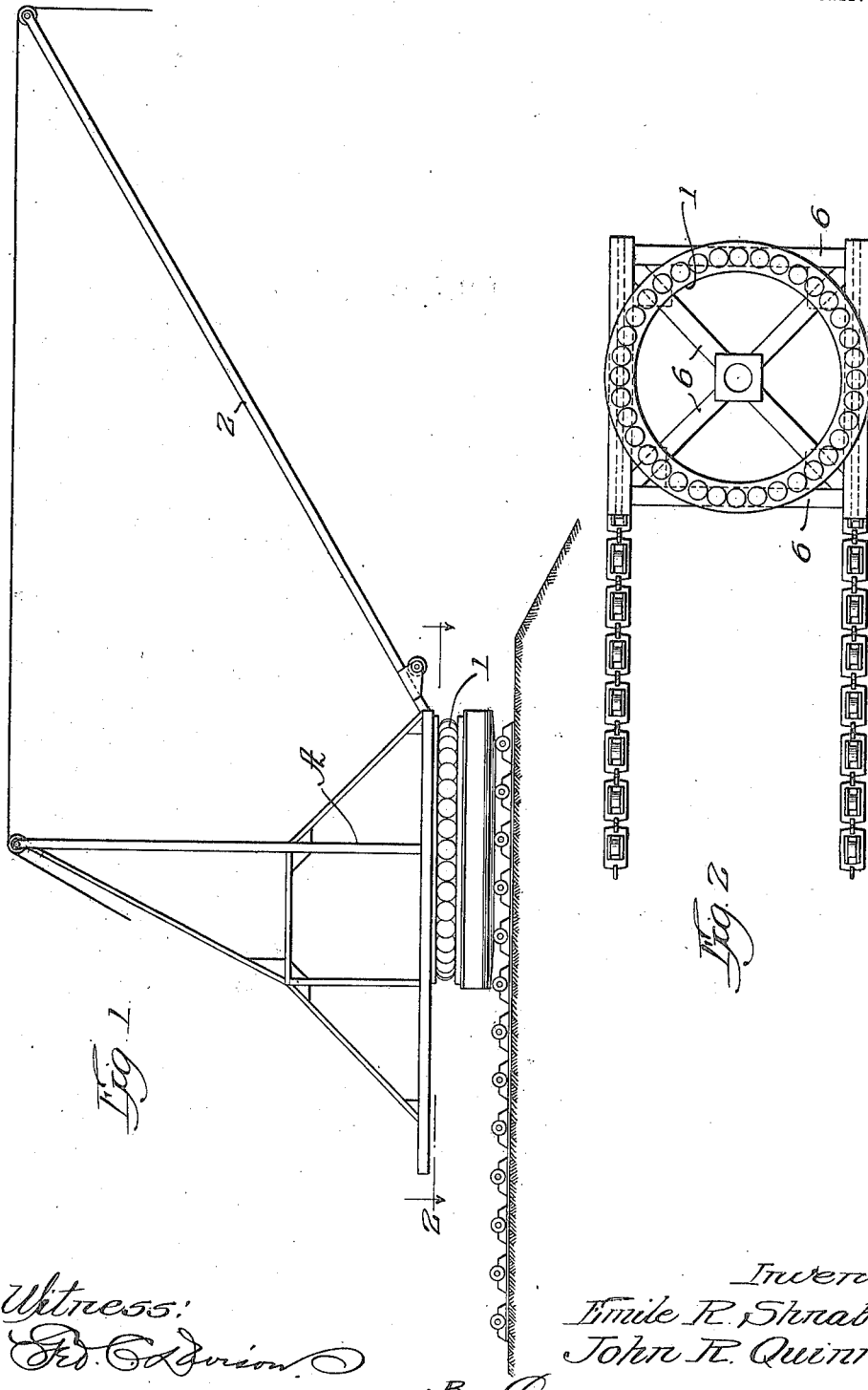

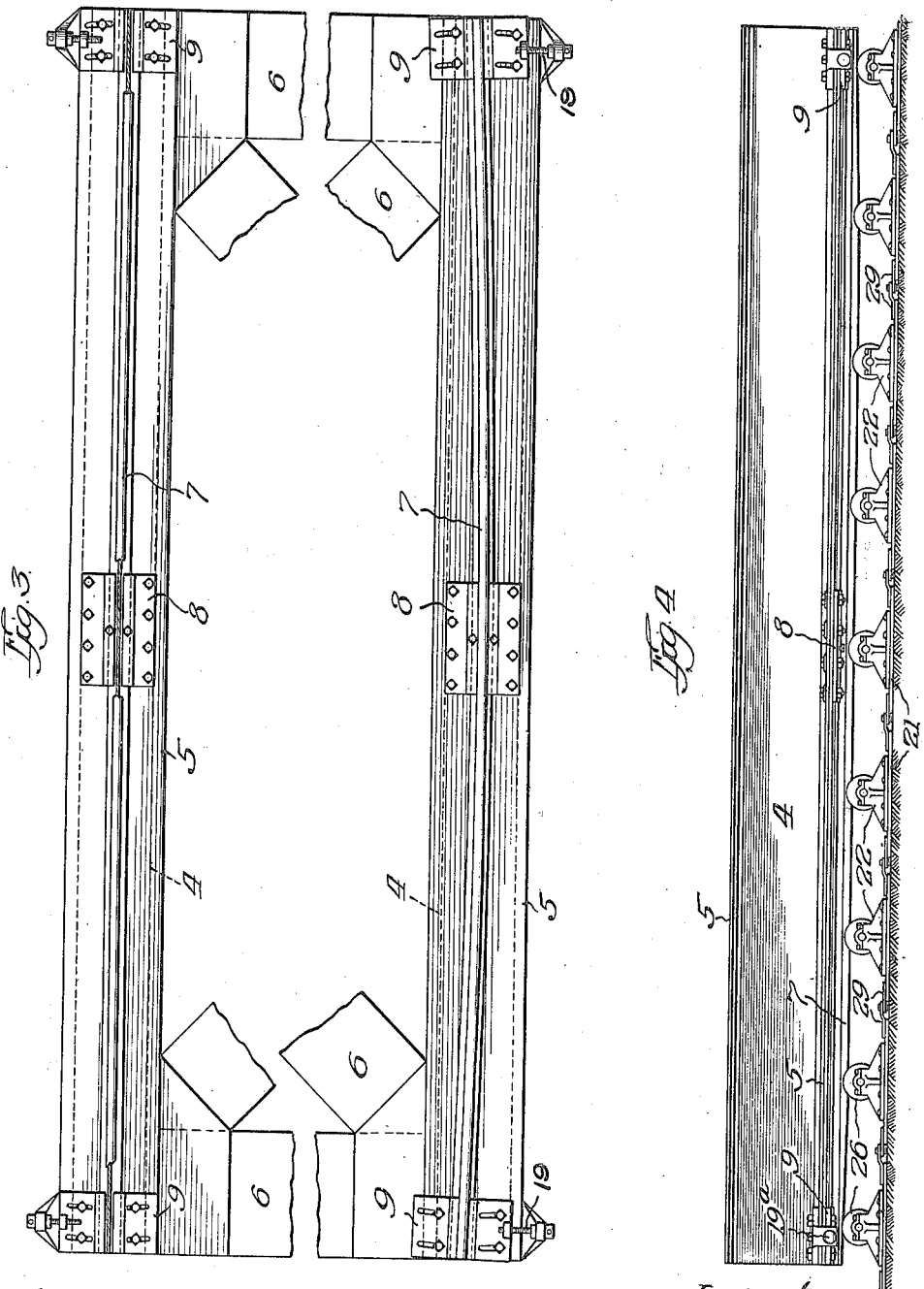

Patented Oct. 10, 1922.

1,431,699

UNITED STATES PATENT OFFICE.

EMILE R. SHNABLE, OF WILMETTE, AND JOHN R. QUINN, OF CHICAGO, ILLINOIS.

RUNNING GEAR.

Application filed March 2, 1922. Serial No. 540,640.

*To all whom it may concern:*

Be it known that we, EMILE R. SHNABLE and JOHN R. QUINN, citizens of the United States, residing, respectively, at Wilmette and Chicago, in the county of Cook and State of Illinois, have invented certain new and useful Improvements in Running Gears, of which the following is a specification.

This invention relates to gear for the transportation and handling of heavy structures or articles, and has to do particularly with means for facilitating the movement of heavy machinery from one operating station to another. It finds particular utility in the movement of heavy objects over surfaces which are more or less irregular, and where it is not feasible to lay a track or employ a vehicle for their transportation.

The general object of the invention is the provision of gear adapted for the uses just mentioned, which will be strong and durable to withstand rough usage, and which admits of a desirable flexibility and versatility in its employment so as to function effectively under a great variety of conditions.

An object of the invention is the provision of gear of the sort described, which does not impose limitations upon the distance or direction of transportation of the object which is moved.

A more specific object of the invention is the provision of gear which includes a roller trackway composed of elements which may be shifted and moved to constitute a supporting and guiding anti-friction track for a movable carriage, the constituent parts of which track after being passed over by the carriage may be re-assembled with associated elements ahead of the carriage to prolong the track upon the course which it is intended that the carriage shall take.

Another object of the invention is the provision of gear of the sort described in which the cooperating and associated anti-friction elements of the track are articulated in such fashion that they will bear the desired relationship to support and transmit the carriage, and in such fashion that the direction of the track may be varied as desired.

Another object of the invention is the provision of gear of the sort described in which an articulated anti-friction track and a carriage designed for movement thereon are arranged for cooperation in such fashion that the track will guide the course of the carriage in directions predetermined by the disposal of the former.

A still further object of the invention is the provision of gear of the sort described in which the anti-friction elements of the track and the carriage are constructed and related in such fashion as to facilitate curving of the latter in the course of its movement.

Other and further objects of the invention will be pointed out hereinafter, indicated in the appended claims, or obvious to one skilled in the art from the present disclosure.

In the drawings forming a part of this specification we have shown for the purpose of illustration, one structural form in which the invention may be embodied, and have shown such form as applied to use with a derrick of a sort employed in a drag-line excavator. It will be understood, however, that the invention is susceptible of embodiment in forms differing from that one illustrated and that it may be employed in conjunction with other transportable objects, apparatus or machine. Accordingly it is to be understood that the present disclosure is not to be construed in any sense such as to limit the invention short of its true and most comprehensive scope in the art.

In the said drawings,

Fig. 1 is a diagrammatic representation of a dragline excavator associated with our improved gear, the view being in the nature of a side elevation;

Fig. 2 is a diagrammatic illustration in the nature of a top or plan view of the gear, the same being in the nature of a section substantially on line 2—2 of Fig. 1;

Fig. 3 is a fragmentary bottom view of the carriage or bed frame, parts being broken away;

Fig. 4 is a side elevation of the same;

Fig. 5 is a detail in the nature of a side elevation of one of the roller blocks, showing its association with a connecting roller block and with a portion of the carriage bed or frame;

Fig. 6 is an end elevation of one of the roller blocks, showing lower portions of the carriage frame in section;

Fig. 7 is a top or plan view of a roller block and a portion of another;

Fig. 8 is a detail in the nature of a bottom view of a runner-rail shifting plate, and Fig. 9 is a sectional view of the same taken substantially on line 9—9 of Fig. 8.

Further understanding of the invention will best be had by reference to the drawings in detail, in which like reference characters are applied to like parts throughout. In these drawings it will be understood that the reference character A designates generally the transported object or apparatus, here shown as a drag-line excavator derrick mounted on a turn-table 1 and having a boom 2 adapted to be swung to different positions by mechanism of well known sorts. The derrick and the turn-table are shown mounted upon a bed frame or carriage, the construction of which may be varied as desired, and which constitutes an element of the invention. In the bed frame or carriage illustrated, a pair of I-beams 4 are arranged in collateral parallel relationship with cover plates 5 affixed to their upper and lower flanges, and with the girders thus formed connected by suitable cross frame members 6. This forms a bed frame or carriage of general rectangular shape and of the desired strength and rigidity to carry the intended loads. Affixed to the lower sides of these girders, and extending longitudinally thereof, are the runner rails 7. These may be of the form of the ordinary railroad T-rail. The rails are mounted on the respective girders by means of center chair castings 8 and shiftable end plates 9. As best seen in Figs. 6 and 7, the chair castings may be in the nature of a longitudinally slotted member attached to the beam by bolts 10 and having a medial slot or channel adapted to receive the flange of the runner rail and accommodate the web thereof, to retain the rail in such fashion that its web is normally in alignment with the web of the I-beam 4. Suitable securing means, such as bolts 11, may be employed for retaining the rail against shifting longitudinally in the chair member.

As seen in Figs. 3, 8 and 9, the shiftable plates 9 may be disposed conveniently adjacent the ends of the girders, and secured thereto by bolts 12 which are drawn up against spacers 14 disposed in slots 15 formed in the lateral portions of the plate. Between the opposite slots the plate is provided with a longitudinal channel way designed to receive the flange and accommodate the web of the rail. A bracket 16, secured to the beam by bolts 17 extends laterally outside the beam and has a depending arm 18 rotatably supporting a screw 19 having thread engagement with a depending marginal boss 20 of the plate 9. The screw 19 is held against longitudinal shifting in the arm 18, but is rotatable therein by engagement of the head 19ª, by which rotation of the screw the plate 9 may be shifted either inwardly or outwardly transversely of the girder upon which it is mounted. This will have the effect of flexing the runner rail transversely, as shown in the lower portion of Fig. 3, to a degree dependent upon the extent to which the plate or plates 9 are shifted. As the rail is held midway by the chair casting 18, this flexion will cause it to assume a curved contour.

Arranged for cooperation with the carriage is a plurality of roller blocks, an illustrative construction of which is shown in Figs. 5, 6 and 7. Each roller block includes a rigid bed plate 21 which is of substantial area so that each block has adequate independent support, upon which bed plate is mounted a pillow block 22 having upstanding lateral webs affording bearings 24. In these bearings is journaled the axle 25 of the roller 26 which has lateral flanges 27, the roller and axle being retained in place by cover bearings 28. The ends of the bed plate preferably are somewhat beveled on opposite sides, and at substantially the median points of the opposite ends of the bed plate are secured the coupling flanges 28, one being deflected to a higher plane than the other, as best seen in Fig. 5. These flanges are pierced for the reception of a coupling bolt 30 whereby the roller blocks may be pivotally secured together. A plurality of like roller blocks being thus connected and disposed on parallel lines so that the center lines of the rollers of the respective series will be spaced apart approximately the same distance as the runner rails of the carriage, the latter, with the heads of the rails travelling on the rollers, as illustrated in Fig. 6, may be moved along over the anti-friction track thus formed. The connection of the roller blocks in series holds them in proper longitudinal and transverse spacing for cooperation with the runner rails, and the latter are retained on the rollers and guided in proper direction by the action of the roller flanges. In order to insure the runner rails coming onto the successive rollers gently, the ends of the rails may be beveled off as illustrated in Fig. 4. As soon as the carriage has passed over a roller block, or a number of roller blocks, they may be detached from those ahead of them and carried to the forward end of the series and connected in again to support and transmit the carriage in the course of its movement. When it is desired to change the direction of movement of the carriage, the series of roller blocks may be laid on an arc, and in the event the degree of curvature is great enough to demand it, the runner rails may be curved to the proper degree by adjustment of the shifting plates 9 as above described. Such curving of the rails may be accomplished incident to the movement of the carriage. When utilized in conjunction with a derrick, the shifting of the roller blocks from the rear to the front of the series may be accomplished with facility by attaching them to the derrick boom by grapples, and then swinging the boom around to deposit the roller blocks in the proper position.

This invention provides a gear adapted to facilitate the transportation of heavy objects, and may be employed effectively where the objects are to be moved over irregular surfaces, as the flexible connection of the roller blocks permits them to accommodate themselves to variations in direction or degree of slope. Machinery supported on the carriage may be operated while resting upon the roller trackway, or it may be blocked up off of the carriage so as to be supported on another foundation, or the carriage may blocked up off of the roller trackway. The width of the rollers 26 preferably is such as to allow an extent of lateral play of the rails on them, to accommodate limited curvature of the roller trackway or slight variation in alignment of the roller blocks.

We claim:

1. Gear of the sort described comprising, in combination, a plurality of independently movable self-sustaining roller blocks, rollers operably mounted on the blocks severally, connecting means joining the blocks for relative movement, and a carriage having runner rails adapted to travel on said rollers, said rails being of length sufficient to traverse a plurality of connected roller blocks.

2. Gear of the sort described comprising, in combination, a plurality of individually shiftable roller blocks having rollers operably mounted thereon, said rollers being provided with flanges, connecting means for joining said roller blocks in series, and a carriage arranged for movement on said rollers, said carriage including a rail member adapted to find support upon the rollers of a plurality of connected roller blocks between the flanges of the several rollers.

3. In gear of the class described, in combination, a plurality of relatively movable self-sustaining roller blocks having rollers operably mounted thereon, connecting means for flexibly joining said roller blocks in articulated series to maintain their spacing, and a carriage arranged for progressive movement over connected roller blocks, said carriage having a rail member adapted to ride upon said rollers.

4. In a gear of the class described, in combination, a plurality of relatively movable roller blocks having rollers operably mounted thereon, connecting means for joining said roller blocks in series, a carriage arranged for progressive movement over said blocks, said carriage having a rail member adapted to travel on the rollers, and means on the carriage for flexing the rail member horizontally.

5. In gear of the class described, in combination, a plurality of relatively movable roller blocks having rollers operably mounted thereon, connecting means for joining said roller blocks in series, a carriage arranged for progressive movement over said blocks, said carriage having a rail member adapted to travel on the rollers, and means on the carriage for flexing the rail member horizontally, said rollers having lateral guide flanges for cooperation with said rail member.

6. In gear of the class described, the combination of a plurality of relatively movable independently supported roller blocks, connecting means for joining said blocks in series, said blocks including respectively a portion affording a supporting base and a roller operably mounted thereon, said connecting means being arranged to maintain the peripheral surfaces of juxtaposed rollers in facing relationship.

7. In gear of the class described, a plurality of interchangeable individually shiftable roller blocks having supporting bases and rollers operably mounted thereon, and connecting means for joining said roller blocks in articulated series with rollers of connected roller blocks providing an anti-friction support.

8. In gear of the class described, a roller block including a plate affording a supporting base of substantial area, bearing members supported thereon, a roller operably affixed to the bearing members with its axis extending parallel to said supporting base, and connecting means affixed to the plate at opposite sides of the roller axis for cooperation with similar roller blocks, whereby a plurality of the roller blocks may be joined in an articulated series.

9. In gear of the class described, the combination with a plurality of associated supporting rollers, of a carriage arranged for movement over said rollers, a rail member forming an operative connection between said rollers and carriage, shiftable members mounted on the carriage and cooperating with end portions of the rail, connecting means joining an intermediate portion of the rail to the carriage, and operable means for moving the shiftable member on the carriage to flex the rail transversely.

10. In gear of the class described, the combination with a movable carriage of parallel rail members forming a support for the carriage, a series of interchangeable and individually shiftable roller blocks associated with each of said rail members, and rollers mounted on the respective roller blocks to afford an anti-friction supporting trackway for the rail members.

11. Gear of the sort described comprising, in combination, a plurality of independently supported and individually shiftable roller blocks having rollers operably mounted thereon, said rollers being provided with terminal flanges, means for securing the roller blocks together in series susceptible of relative movement, a carriage adapted for support on the rollers, and rail members affixed to the carriage and formed to have riding support between the flanges of the rollers in the respective series, whereby the course of travel of the carriage may be predetermined by the location of the roller blocks.

12. In gear of the class described, in combination, a plurality of independently shiftable roller blocks having rollers operably affixed thereto, said rollers being provided with terminal flanges, a carriage adapted for support on said roller blocks, rail members mounted on the carriage and formed to find travelling support on the rollers between the flanges, and means on the carriage for flexing the rail members.

13. In gear of the class described, in combination, a plurality of individually shiftable roller blocks having relatively broad supporting bases affording a substantial area of contact with a supporting surface, rollers operably affixed to the several roller blocks, means for connecting the several roller blocks to one another to form independently shiftable series, a carriage adapted for support on the roller blocks, and rail members mounted on the carriage and adapted for riding support on the rollers in the respective series, said rail members being of extent sufficient to engage simultaneously a plurality of rollers in the respective series.

14. In gear of the class described, the combination with a movable carriage of runner rails supported thereon and a shiftable flexibly articulated trackway of conjoined roller blocks having rollers operably affixed thereto and arranged to provide a roller support for the rail members.

In testimony whereof we have hereunto subscribed our names.

EMILE R. SHNABLE.
JOHN R. QUINN.